(12) United States Patent
Jia et al.

(10) Patent No.: US 10,580,341 B2
(45) Date of Patent: Mar. 3, 2020

(54) ELECTRONIC DEVICE WITH COLOR SENSING AMBIENT LIGHT SENSOR

(71) Applicant: Apple Inc., Cupertino, CA (US)

(72) Inventors: Zhang Jia, Santa Clara, CA (US); Christopher S. Erickson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 906 days.

(21) Appl. No.: 14/870,924

(22) Filed: Sep. 30, 2015

(65) Prior Publication Data

US 2016/0232828 A1 Aug. 11, 2016

Related U.S. Application Data

(60) Provisional application No. 62/114,918, filed on Feb. 11, 2015.

(51) Int. Cl.
*G09G 3/20* (2006.01)
*G01J 1/04* (2006.01)
(Continued)

(52) U.S. Cl.
CPC .......... *G09G 3/2003* (2013.01); *G01J 1/0407* (2013.01); *G01J 1/0422* (2013.01);
(Continued)

(58) Field of Classification Search
CPC ..................... G09G 2360/144; G09G 2360/14
See application file for complete search history.

(56) References Cited

U.S. PATENT DOCUMENTS 4,989,982 A * 2/1991 Osaki ........................ G01J 3/51
356/405
5,739,914 A 4/1998 Chida et al.
(Continued)

FOREIGN PATENT DOCUMENTS

CN 101095036 A 12/2007
CN 101788342 A 7/2010
(Continued)

OTHER PUBLICATIONS

"Galaxy S5 Explained: the Display", SAMSUNG Newsroom, Apr. 23, 2014, [Retrieved on Dec. 8, 2015], Retrieved from Internet:<URL:http://news.samsung.com/global/galaxys5explainedthedisplay>.
(Continued)

*Primary Examiner* — Lixi C Simpson
(74) *Attorney, Agent, or Firm* — Treyz Law Group, P.C.; G. Victor Treyz; David K. Cole

(57) ABSTRACT

An electronic device may be provided with a display mounted in a housing. A color sensing ambient light sensor may measure the color of ambient light. The color sensing ambient light sensor may be mounted in alignment with an ambient light sensor window formed in an inactive area of the display. The color sensing ambient light sensor may be formed from detectors on a semiconductor substrate. The detectors may include detectors that have spectral sensitivity profiles matching those of color matching functions. The color sensing ambient light sensor may include an infrared light detector. Light redirecting structures such as a diffuser, prism film, negative lens film, or privacy film may be used in directing light into the ambient light sensor. The color sensing ambient light sensor may be calibrated by exposing the sensor to light sources of different types.

30 Claims, 16 Drawing Sheets

(51) Int. Cl.
*G01J 3/02* (2006.01)
*G01J 3/51* (2006.01)
*G01J 1/42* (2006.01)
*G01J 1/32* (2006.01)
*G01J 3/46* (2006.01)

(52) U.S. Cl.
CPC ............... *G01J 1/32* (2013.01); *G01J 1/4204* (2013.01); *G01J 3/0205* (2013.01); *G01J 3/0216* (2013.01); *G01J 3/465* (2013.01); *G01J 3/513* (2013.01); G09G 2360/144 (2013.01)

(56) References Cited

U.S. PATENT DOCUMENTS

| | | | |
|---|---|---|---|
| 7,728,845 B2 | 6/2010 | Holub | |
| 8,536,511 B2 | 9/2013 | Tam | |
| 2007/0027651 A1 | 2/2007 | Ng et al. | |
| 2008/0303918 A1 | 12/2008 | Kiethley | |
| 2009/0085848 A1 | 4/2009 | Huang et al. | |
| 2010/0182598 A1* | 7/2010 | Choi | G01J 3/02 356/323 |
| 2012/0019494 A1* | 1/2012 | Lum | G09G 5/10 345/207 |
| 2012/0170284 A1* | 7/2012 | Shedletsky | G02F 1/13318 362/355 |
| 2012/0253727 A1* | 10/2012 | Lianza | G01J 3/462 702/104 |
| 2013/0050703 A1* | 2/2013 | Shannon | G01J 3/465 356/402 |
| 2013/0105668 A1 | 5/2013 | Ho et al. | |
| 2014/0132578 A1 | 5/2014 | Zheng | |
| 2014/0312234 A1* | 10/2014 | Tan | G01J 1/4228 250/349 |
| 2015/0002707 A1* | 1/2015 | Wu | H01L 27/14621 348/279 |
| 2017/0202071 A1* | 7/2017 | Chen | H05B 33/086 |

FOREIGN PATENT DOCUMENTS

| | | |
|---|---|---|
| CN | 103019409 A | 4/2013 |
| CN | 103913856 A | 7/2014 |
| CN | 205508354 U | 8/2016 |
| WO | 2006055682 | 5/2006 |
| WO | 2015015493 | 2/2015 |

OTHER PUBLICATIONS

"Introducing the All New Fire HDX—Higher Performance, Exclusive New Audio, the Fastest WiFi, and Still Startlingly Light with a Stunning HDX Display", Amazon Media Room: Press Release, [Retrieved on Dec. 8, 2015], Retrieved from Internet:<URL: http://phx.corporateir.net/phoenix.zhtml?c=176060&p=irolnewsArticle_pf&ID=1969157>.

* cited by examiner $$\underbrace{\begin{pmatrix} X_1 & \ldots & X_m \\ Y_1 & & Y_m \\ Z_1 & & Z_m \end{pmatrix}}_{P} = A \underbrace{\begin{pmatrix} PD1_1 & & PD1_m \\ PD2_1 & & PD2_m \\ PD3_1 & \ldots & PD3_m \\ PD4_1 & & PD4_m \\ PD5_1 & & PD5_m \\ PD6_1 & & PD6_m \end{pmatrix}}_{Q}$$

*FIG. 12*

ELECTRONIC DEVICE WITH COLOR SENSING AMBIENT LIGHT SENSOR

This application claims the benefit of provisional patent application No. 62/114,918 filed on Feb. 11, 2015, which is hereby incorporated by reference herein in its entirety.

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light conditions sometimes include significant changes in color. For example, an electronic device may be used in a cool color temperature environment such as outdoors shade or a warm color temperature environment such as an indoors environment that has been lit with incandescent lighting. Content that appears to be correctly displayed on a display in one of these environments may have an unpleasant color cast in the other environment. For example, a display that is properly adjusted in an outdoors environment may appear overly cool under incandescent lighting.

It would therefore be desirable to be able to improve the presentation of color images or to take other suitable actions based on ambient lighting attributes such as ambient light color information.

SUMMARY

An electronic device may be provided with a display mounted in a housing. A color sensing ambient light sensor may measure the color of ambient light. The color sensing ambient light sensor may be mounted in alignment with an ambient light sensor window formed in an inactive area of the display or elsewhere within the housing.

The color sensing ambient light sensor may be formed from an array of light detectors on a semiconductor substrate. Some of the detectors may have spectral sensitivity profiles that fully or partly match those of color matching functions. The color sensing ambient light sensor may also include an infrared light detector.

Light redirecting structures such as a diffuser, prism film, negative lens film, or privacy film may be used in directing light into the ambient light sensor. A sensor enclosure may surround the ambient light sensor and may have an aperture that allows ambient light with a restricted angle of view to reach the ambient light sensor.

During operation of the device, the color sensing ambient light sensor may make measurements to identify the type of light source that is currently being used in the vicinity of the device. For example, the color sensing ambient light sensor may determine whether the device is being exposed to an infrared or non-infrared light source and can discriminate between different types of light sources having different respective correlated color temperatures. The color sensing ambient light sensor may be calibrated by exposing the sensor to light sources of different types. During operation, calibration data can be retrieved and used in calibrating the sensor that is based on the currently identified light source type.

BRIEF DESCRIPTION OF THE DRAWINGS

FIG. 12 is a matrix equation showing the relationship between the color coordinates for a set of light sources and a color converting matrix and measured color sensing ambient light sensor signals for the set of light sources in accordance with an embodiment.

DETAILED DESCRIPTION

Figure 1:
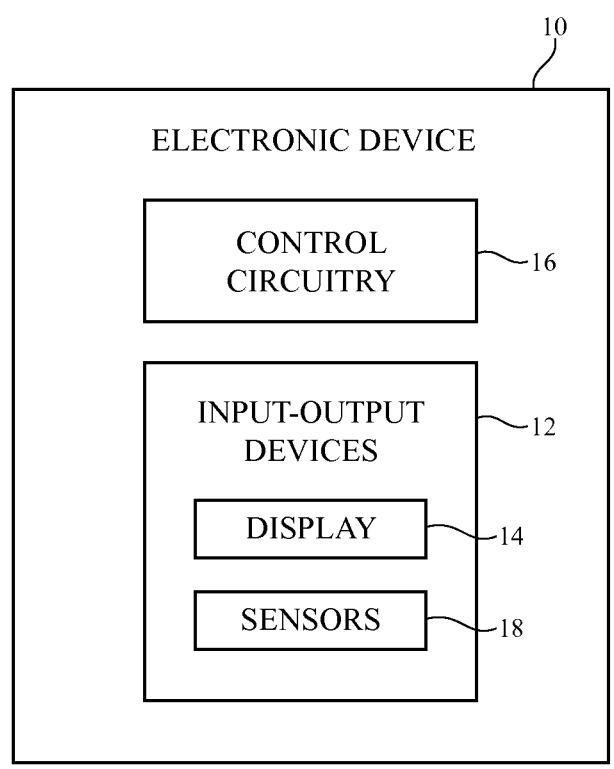
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

An ambient light sensor for device 10 may have an array of detectors each of which is provided with a different respective color filter. Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action.

The array of colored detectors may also be used to make color measurements (i.e., the ambient light sensor may be a color sensing ambient light sensor). Color measurements may be gathered as color coordinates, color temperature, or correlated color temperature. Processing circuitry may be used to convert these different types of color information to other formats, if desired (e.g., a set of color coordinates may be processed to produce an associated correlated color temperature, etc.). Configurations in which the color information gathered by the ambient light sensor is a set of color coordinates are sometimes described herein as an example. This is, however, merely illustrative. The color sensing ambient light sensor may gather any suitable color information on ambient light. Total brightness (ambient light intensity) may also be measured.

Color information from the color sensing ambient light sensor (and/or brightness information) can be used to adjust the operation of device 10. For example, the color cast of display 14 may be adjusted in accordance with the color of ambient lighting conditions. If, for example, a user moves device 10 from a cool lighting environment to a warm lighting environment (e.g., an incandescent light environment), the warmth of display 14 may be increased accordingly, so that the user of device 10 does not perceive display 14 as being overly cold. If desired, the ambient light sensor may include an infrared light sensor. In general, any suitable actions may be taken based on color measurements and/or total light intensity measurements (e.g., adjusting display brightness, adjusting display content, changing audio and/or video settings, adjusting sensor measurements from other sensors, adjusting which on-screen options are presented to a user of device 10, adjusting wireless circuitry settings, etc.).

Figure 2:
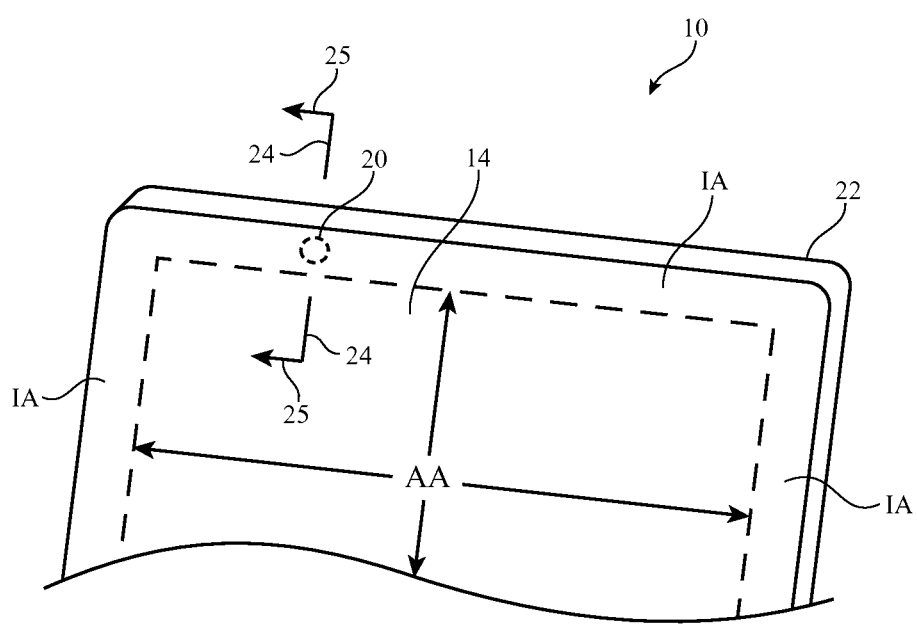
FIG. 2 is a perspective view of a portion of an electronic device display within which an ambient light sensor has been mounted in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.)

may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region 20 in inactive border area IA. Ambient light from the exterior of device 10 may be measured by an ambient light sensor in device 10 after passing through region 20 and the display cover layer.

Figure 3:
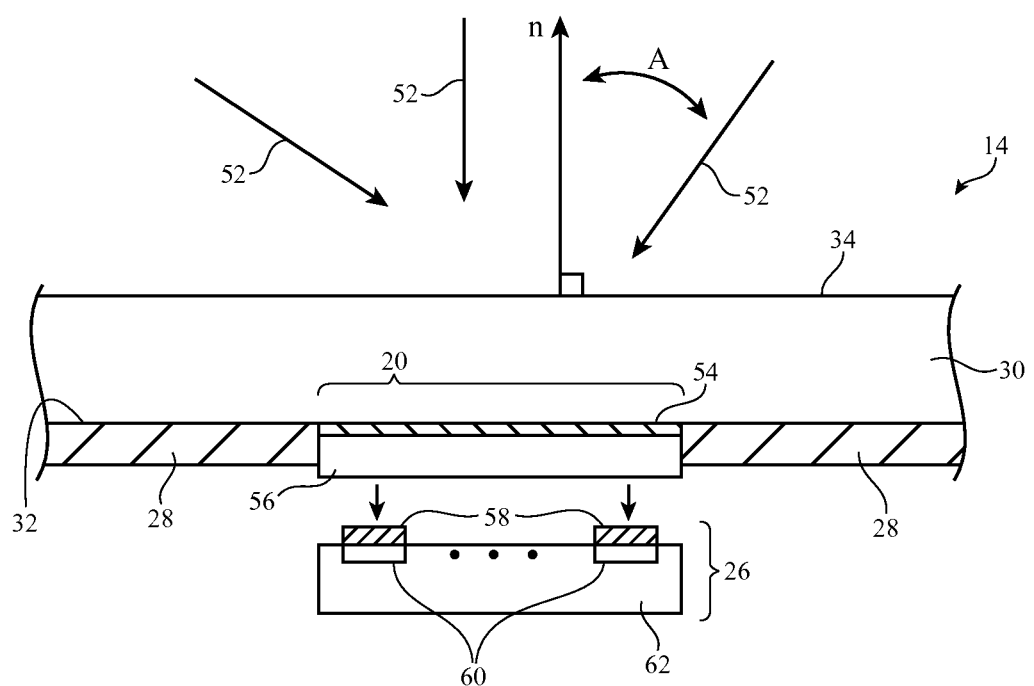
FIG. 3 is a cross-sectional side view of an illustrative light sensor that is being exposed to ambient light in accordance with an embodiment.

FIG. 3 is a cross-sectional side view of display 14 of FIG. 2 taken along line 24 and viewed in direction 25 of FIG. 2. As shown in FIG. 3, light sensor 26 may be mounted in alignment with window 20. Window 20 may have a circular shape, a square shape, a shape with curved and/or straight edges, a circular ring shape with a central opaque region, or any other suitable shape. Light sensor 26 may be a color sensing ambient light sensor that is used in measuring ambient light in the vicinity of device 10. As shown in FIG. 3, display 14 may have an outermost layer such as display cover layer 30. Display cover layer 30 has an outer surface such as surface 34. Surface normal n is perpendicular to surface 34. Rays of ambient light 52 are characterized by various angles of incidence A (measured with respect to surface normal n).

Window 20 may be formed from an opening in opaque masking layer 28 on inner surface 32 of display cover layer 30 in inactive area IA. Layer 30 may be formed from glass, plastic, ceramic, sapphire, or other transparent materials and may be a part of a display module for display 14 or may be a separate protective layer that covers active display structures. The opening associated with window 20 may be filled with optical structures such as ambient light sensor ink 54 and light redirecting structures 56.

Ambient light sensor ink 54 may have sufficient transparency at visible and infrared wavelengths to allow sensor 26 to operate, while at the same time enhancing the outward appearance of window 20 (e.g., by partly obscuring the presence of window 20 to a user of device 10 by making window 20 have a visual appearance that is not too dissimilar from the portion of layer 30 that includes layer 28). If desired, ambient light sensor ink 54 may be omitted.

Sensor 26 may have multiple light detectors 60 (e.g., photodiodes, phototransistors, or other semiconductor photodetector structures). Light detectors 60 may be formed in an array on a common semiconductor substrate such as substrate 62 or may be formed using two or more substrates. Each of light detectors 60 may be provided with a corresponding color filter 58. To provide sensor 26 with the ability to accurately measure colors, sensor 26 may include two or more detectors 60 (e.g., 2-10 detectors, 3-8 detectors, 4-7 detectors, 5-7 detectors, only 4 detectors or more than 4 detectors, only 5 detectors or more than 5 detectors, only 6 detectors or more than 6 detectors, only 7 detectors or more than 7 detectors, only 8 detectors or more than 8 detectors, fewer than 8 detectors, or any other suitable number of detectors). Filters 58 may be thin-film interference filters and/or may be colored layers of polymer or other color filter elements (e.g., colored filters formed from dyes and/or pigments).

Light redirecting structures 56 may be used to gather light 52 from a variety of angles of incidence A and to effectively pass this light to sensor 26. Light redirecting structures 56 may include structures such as diffusers and/or patterned lenses to help redirect off-axis ambient light rays into sensor 26 at an angle that is close to perpendicular to the surface of substrate 62, thereby reducing the dependence of ambient light readings on the relative orientation between device 10 and the sources of ambient light.

Figure 4:
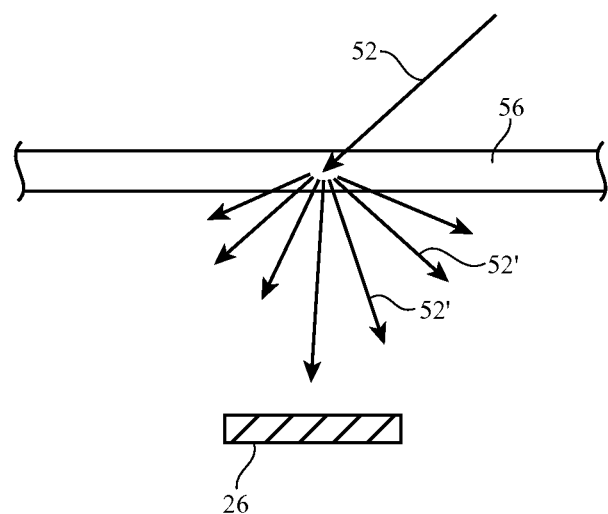
FIG. 4 is a cross-sectional side view of an illustrative light diffuser for an ambient light sensor in accordance with an embodiment.
Figure 5:
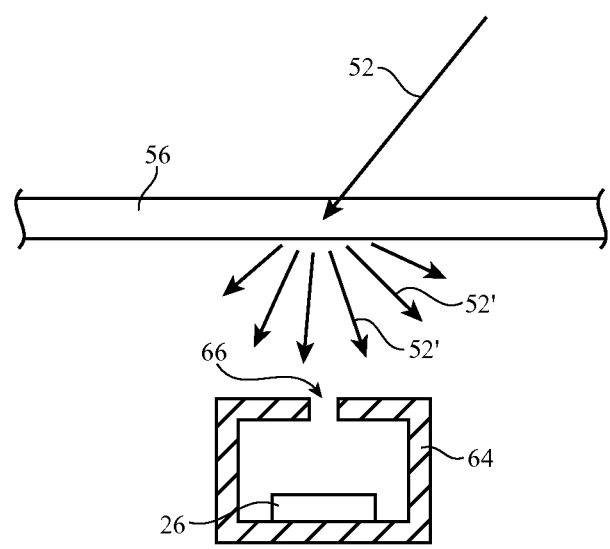
FIG. 5 is a cross-sectional side view of an illustrative interior enclosure with an aperture to allow light with a range of desired angular orientations to pass to an ambient light sensor in accordance with an embodiment.

FIG. 4 illustrates how light redirecting structures 56 may be formed from a layer of diffuser film. With this type of arrangement, incoming rays such as ray 52 may be scattered within the diffuser film to produce scattered rays 52' that are measured by sensor 26. The use of a diffuser structure such as the diffuser of FIG. 4 helps collect light by redirecting incoming off-axis light back towards sensor 26. The diffuser film may be a diffuser having a Lambertian scattering profile (radiance through the diffuser independent of the angle of incident light) or having a scattering profile that differs at any angle of light incidence on the diffuser by less than 20% from a Lambertian scattering profile at that angle of light incidence (as examples).

It may be desirable to provide an aperture above sensor 26 using an internal aperture sensor enclosure. For example, sensor 26 may be mounted in an internal enclosure such as enclosure 64 inside housing 22. Enclosure 64 may be formed from plastic, metal, ceramic, and/or other materials or combinations of these materials. Opening (aperture 66) may be formed in the upper surface of enclosure 64 to create a restricted angle of view for sensor 26 within housing 22. This type of arrangement may help reduce the dependence of the sensitivity of sensor 26 on its orientation with respect to ambient light sources, while preserving a large field of view for gathering incoming ambient light through light redirecting structures 56.

Figure 6:
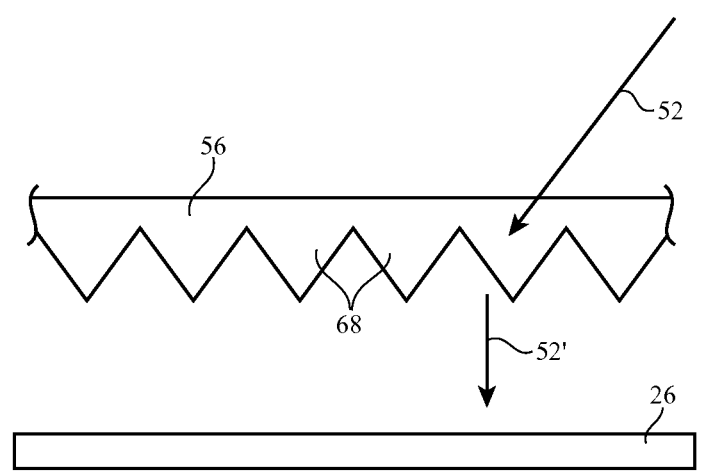
FIG. 6 is a cross-sectional side view of an illustrative prism film for directing light into an ambient light sensor in accordance with an embodiment.

As shown in FIG. 6, light redirecting structures 56 may be formed from prism films. Prism films use triangular ridges, pyramidal structures, or other protrusions to direct incoming off-axis light 52 downwards to sensor 26 (see, e.g., redirected light ray 52' in the example of FIG. 6). Prism films help bend and collimate light rays received over a wide range of angles of incidence. Prism films may include protrusions on one or both sides of a transparent substrate.

Figure 7:
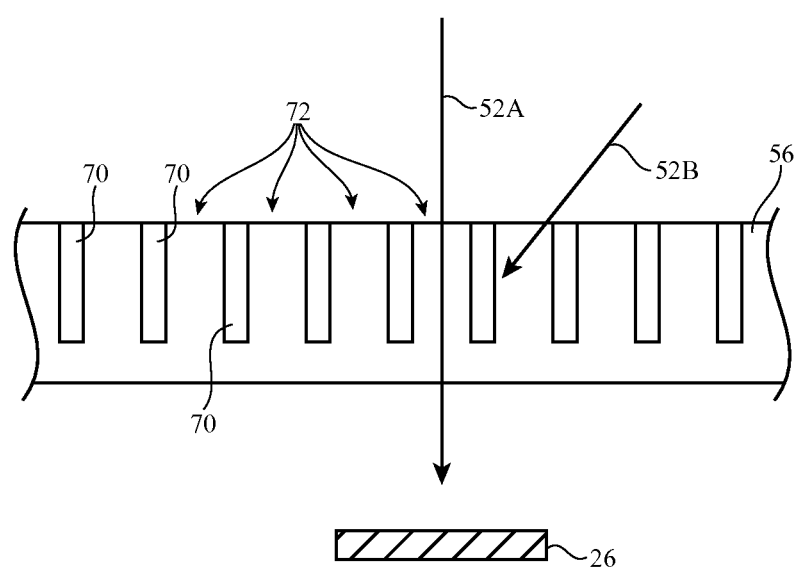
FIG. 7 is a cross-sectional side view of an illustrative microlouvered privacy film that may be placed over an ambient light sensor in accordance with an embodiment.

If desired, light redirecting structures 56 may include privacy films. As shown in FIG. 7, a privacy film may include structures such as microlouvers 70 that define narrow angle-of-view light passage channels such as channels 72. Microlouvers 70 may be formed from opaque polymers, metal, multiple layers of polymer and/or metal (e.g., double layers of metal with aligned openings), or other opaque structures. Off-axis light rays such as light ray 52B will strike microlouvers 70 and will be prevented from reaching sensor 26. On-axis rays such as ray 52A will pass through one of channels 72 and will be detected by sensor 26. Privacy filter structures help eliminate light rays with large angles of incidence.

Figure 8:
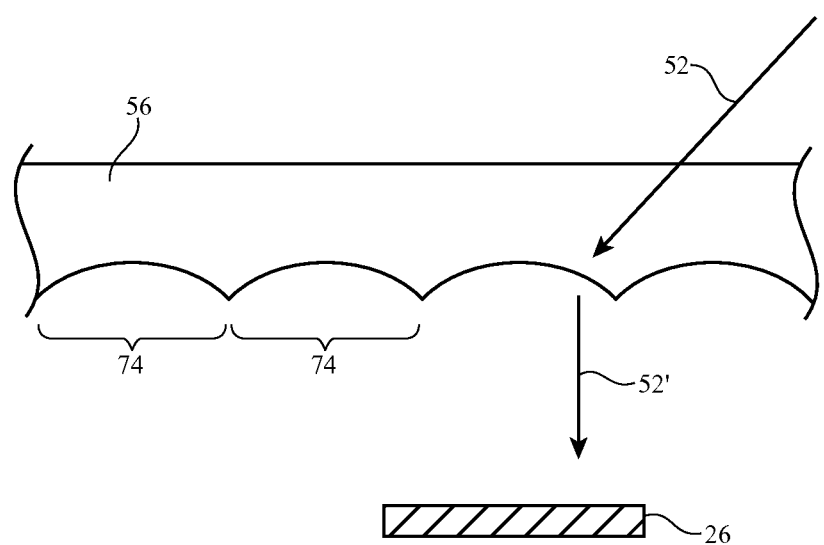
FIG. 8 is cross-sectional side view of an illustrative optical film with a pattern of negative lenses for directing light towards an ambient light sensor in accordance with an embodiment.

In the example of FIG. 8, light redirecting structures 56 have been formed from a film of one-dimensional or two-dimensional array of negative lenses 74 (e.g., negative lens structures on the inner surface of a transparent film). Lenses 74 may help redirect incoming off-axis light rays such as ray 52 to sensor 26, as shown by illustrative redirected light ray 52'. Negative lensing effects in this type of structure help bend light towards sensor 26 and thereby decrease the angle of incidence of the light rays when they reach sensor 26.

If desired, other types of light redirecting structures may be used. Moreover, two or more different types of light redirecting structures may be combined to form light redirecting structures 56. For example, a diffuser can be formed as a coating on the surface of a negative lens film, a diffuser film may be stacked with a prism film and/or a microlouvered film, etc.

Figure 9:
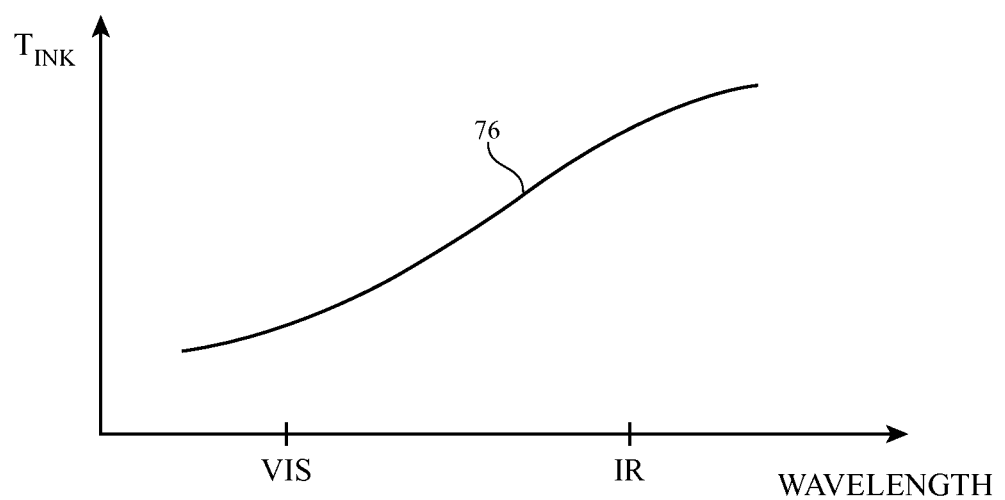
FIG. 9 is a graph in which an illustrative ambient light sensor window ink transmission characteristic has been plotted as a function of wavelength in accordance with an embodiment.

FIG. 9 is a graph in which ink light transmission Tink has been plotted as a function of wavelength for an illustrative ambient light sensor ink such as ink 54 of FIG. 3. As shown by illustrative transmission curve 76, ink 54 may exhibit a non-zero transmission at visible light (VIS) wavelengths and may, if desired, exhibit an increasing transmission toward infrared (IR) wavelengths. The transmission of ink 54 is preferably sufficient to allow sensor 26 to gather ambient light readings in bright and dim light.

Figure 10:
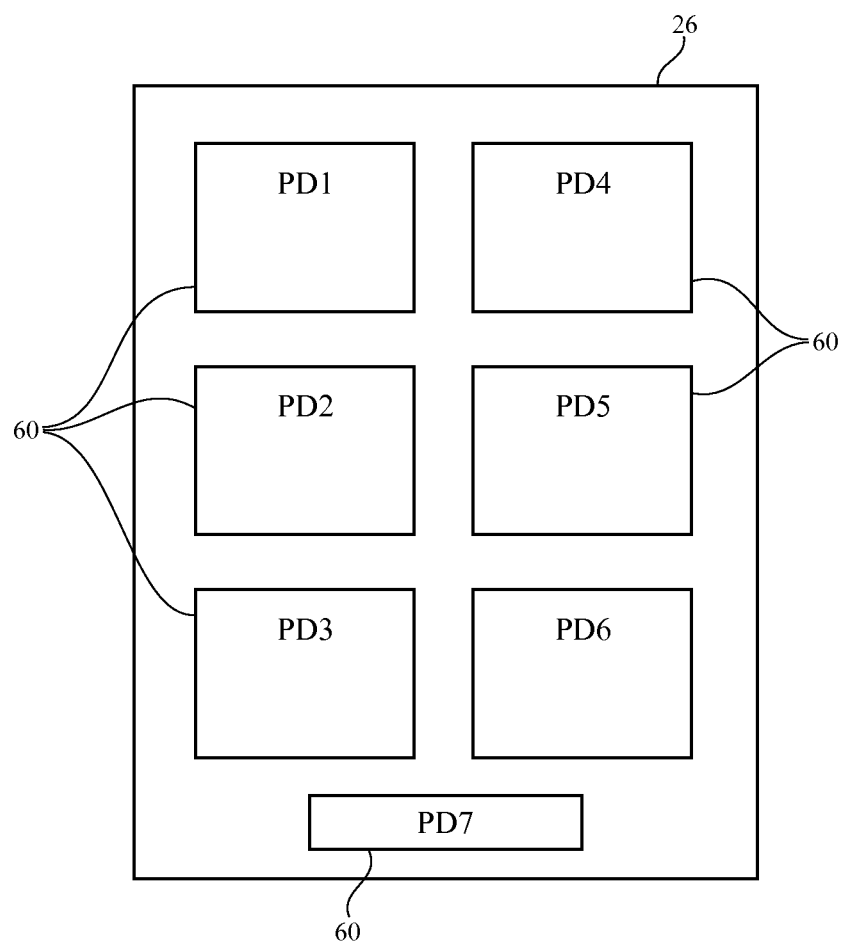
FIG. 10 is a top view of an illustrative multichannel ambient light sensor in accordance with an embodiment.

To allow sensor 26 to make color measurements, sensor 26 may have an array of light detectors 60, each of which may have a different spectral profile for gathering light. There may be any suitable number of visible light detectors in sensor 26 (e.g., two or more, three or more, four or more, five or more, six or more, three or less, four or less, five or less, six or less, less than 10, more than 5, 2-10, 2-15, 4-9, etc. In the example of FIG. 10, there are six visible light detectors 60 (PD1, PD2, PD3, PD4, PD5, and PD6) and one infrared light detector PD7. This is merely illustrative. For example, there may be fewer than six (e.g., five, four, or three or fewer.) or more than six (e.g., seven, eight, or more than eight) visible light detectors. Infrared light detector PD7 may be omitted or infrared light detection capabilities may be provided by extending the long wavelength sensitivity of a red detector so that the red detector has a spectral sensitivity profile that overlaps near infrared wavelengths. As an example, PD7 may be omitted and PD6 may be a red light detector with an extended spectral profile that is sensitive at infrared wavelengths. In this type of configuration, the IR response of PD6 may be used to help discriminate between different types of light sources (e.g., IR or non-IR, etc.) and may provide a visible spectral profile contribution (e.g., red sensitivity) to sensor 26 that helps sensor 26 measure the color of ambient light.

Figure 11:
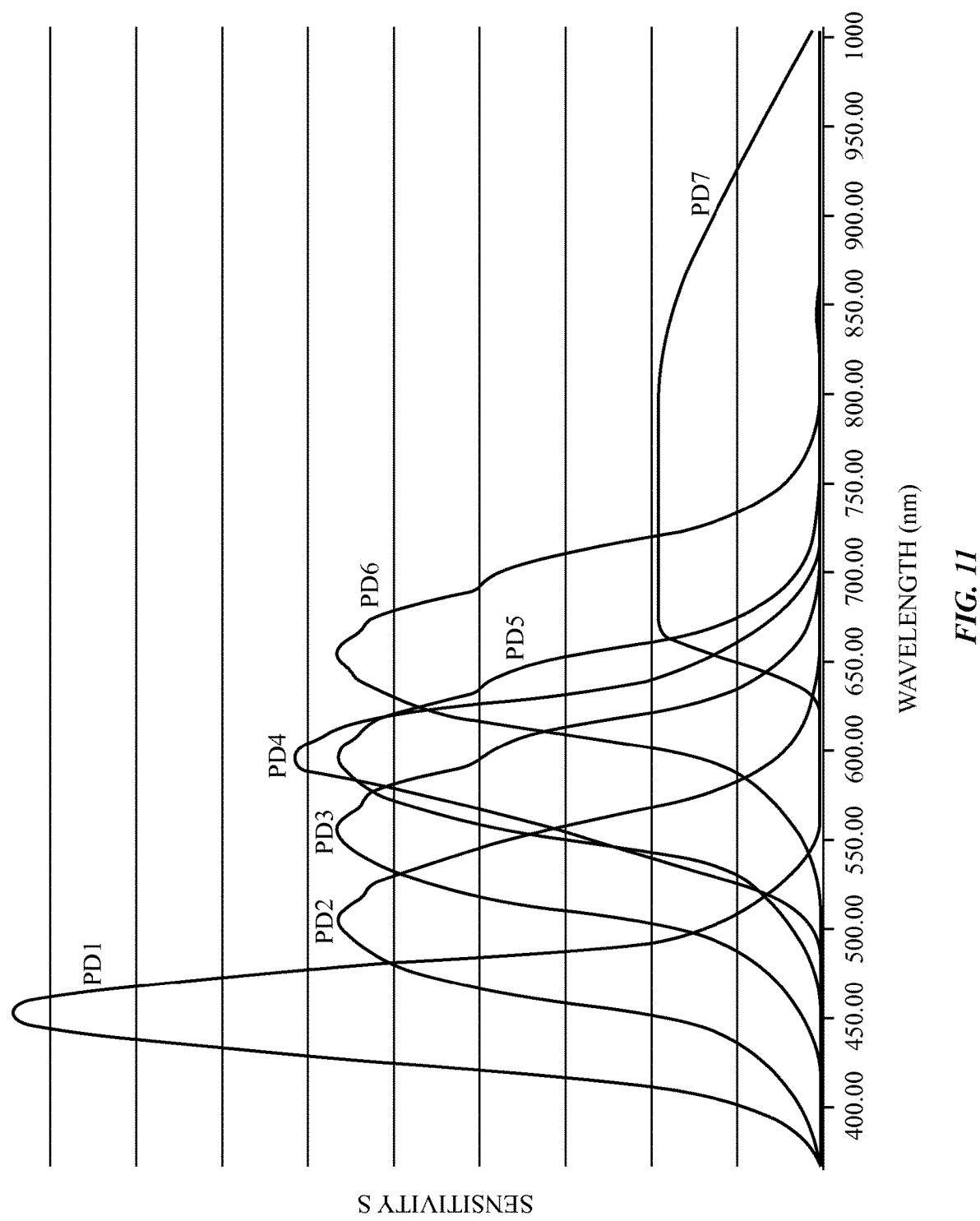
FIG. 11 is a graph in which the spectral sensitivity of each photodetector in an illustrative color sensing ambient light sensor has been plotted in accordance with an embodiment.

Illustrative spectral responses for detectors 60 of FIG. 10 are shown in FIG. 11. As shown in FIG. 11, PD1 may have a blue spectral response, detector PD6 may have a red spectral response, and the spectral responses of detectors PD2, PD3, PD4, and PD5 may cover respective wavelength ranges between the blue and red ends of the visible spectrum. Detector PD7 may cover infrared wavelengths (e.g., wavelengths including wavelengths above 700 nm, between 800-900 nm, etc.).

To enhance color sensing accuracy, it may be desirable to configure the spectral responses of detectors 60 so that one or more of detectors 60 has a spectral response that matches a color matching function (e.g., one of the three CIE standard observer color matching functions $\bar{x}$, $\bar{y}$, and $\bar{z}$). The color matching functions represent the spectral response of a standard observer. In the illustrative configuration of FIG. 11, the spectral response of detector PD1 matches the spectral shape of color matching function $\bar{z}$, the spectral response of detector PD3 matches the spectral shape of color matching function $\bar{y}$, and the spectral response of detector PD4 matches the upper half of color matching function $\bar{x}$ (i.e., the upper hump of the two hump response for $\bar{x}$, which lies between 500 and 700 nm). If desired, one of detectors 60 may fully match for the spectrum of $\bar{x}$. The example of FIG. 11 in which the spectral sensitivity profile for PD4 partly matches color matching function $\bar{x}$ is merely illustrative.

If desired, the spectral sensitivity profile of one or more of the detectors may resemble a standard observer color matching function without actually matching a standard observer color matching function. As an example, a spectral sensitivity profile may be the same as that for standard observer color matching function $\bar{x}$ but at different wavelengths (i.e., the curve shape of the spectral sensitivity profile may match that of the color matching function while the location in wavelength of the curve may differ by plus or minus 15 nm or other suitable amount). As another example, the curve shape of the spectral sensitivity profile may differ somewhat from the color matching function (at the same set of wavelengths or a shifted set of wavelengths). It may be desirable to use one or more spectral sensitivity profiles that lie within a 20% root-mean-square deviation from a standard observer color matching function (disregarding wavelength differences between the spectral sensitivity profile and the standard observer color matching function).

Optical sensors with filters that are responsive in the visible range (380-780 nm) may have overlapping spectral responses. The shape and positions of some of the channels may resemble (e.g., within 20% root-mean-square deviation) standard observer color matching functions (at the same wavelengths or disregarding wavelength). The spectral responses can be configured so that linear combinations of these multiple channels' spectra can resemble (e.g., within 20% error or other suitable deviation) or can match the standard observer color matching functions.

In addition to the spectral responses of detectors 60 that match the color matching functions (or, for the case of PD4 and color matching function $\bar{x}$, that partly match the color matching function by virtue of matching the upper half of the color matching function), detectors 60 may cover other spectral ranges (e.g., ranges that partly overlap other the coverage ranges of other detectors and that help provide coverage over the entire visible spectrum), thereby enhancing color measurement accuracy. At the same time, the use of an excessive number of different detectors may be avoided to avoid excessive cost, complexity, and power consumption. Readings from infrared detector PD7 may be used to enhance accuracy for visible light detection (e.g., by removing infrared contributions to the visible light detectors) and/or may be used to help allow sensor 26 to discriminate between different types of lighting source. As an example, light sources with little or no infrared light may be characterized as non-IR sources, whereas light sources that contain significant light detected by detector PD7 may be characterized as IR sources.

The ability to classify light sources by type may enhance accuracy when computing color coordinates for measured light sources. During calibration operations, color sensor 26 may be calibrated using light sources of different types. For example, calibration measurements may be made by training sensor 26 using multiple infrared light sources and multiple non-infrared light sources. When making color measurements with sensor 26 while a user is using device 10, device 10 may use information on which type of ambient light source is present (IR or non-IR in this example) to determine whether IR or non-IR sensor calibration data should be used in processing sensor measurements. If desired, other types of sensor calibration scheme may be used (e.g., by sweeping a single reference narrowband light source across all wavelengths of interest while making measurements with each of the detectors in sensor 26, etc.). Configurations in which sensor data is processed using light-source-type-dependent calibration techniques are sometimes described herein as an example.

As shown in FIG. 12, a color converting matrix A in matrix equation P=A Q may be used in relating color coordinates (matrix P) to sensor outputs (sensor spectral response matrix Q. In the equation of FIG. 12, each column of matrix Q relates to the output of sensor 26 when exposed to a different respective light source. In the example of FIG. 12, sensor 26 has six visible light sensors, so each column of matrix Q contains six detector outputs PD1 . . . PD6. The first column of matrix Q contains outputs $PD1_1 \ldots PD6_1$ that were obtained when exposing sensor 26 to light from a first light source, the second column of matrix Q contains outputs $PD1_2 \ldots PD6_2$ that were obtained when exposing sensor 26 to a second light source, etc. The outputs of sensor 26 were measured while sensor 26 was illuminated by m different light sources, so matrix Q contains m columns. Matrix P contains columns of color coordinates X, Y, and Z. Each column of matrix P corresponds to the color coordinates of a different measured color. For example, the first column of matrix P contains color coordinates X1, Y1, Z1, corresponding to the color that is measured when exposing sensor 26 to light from light source number 1 (which caused sensor 26 to produce outputs $PD1_1 \ldots PD6_1$), the second column of matrix P contains color coordinates X2, Y2, Z2, corresponding to the color that is measured when exposing sensor 26 to light from light source number 2 (which caused sensor 26 to produce outputs $PD1_2 \ldots PD6_2$), etc.

In the example of FIG. 12, matrix P is a 3×m matrix, matrix Q is a 6×m matrix, and matrix A is a 3×6 matrix. During calibration, different respective A matrices can be computed for different types of light sources. Examples of different light source types include infrared (IR) and non-IR. The non-IR type may, if desired, be subdivided into high and low correlated color temperature types (high CCT and low CCT). With one suitable arrangement, high CCT lighting conditions are characterized by CCT values above 4500K and low CCT lighting conditions are characterized by CCT values below 4500K. These lighting types (or any other suitable lighting types) can each be associated with a different respective version of color converting matrix A (i.e., a different color converting matrix A may be produced for each lighting type to enhance color measurement accuracy). Incandescent lighting and halogen lighting may belong to the IR lighting type. Sunlight is an example of a light source of the high CCT non-IR lighting type. Some fluorescent lighting and light-emitting diode (LED) lighting may be of the high CCT non-IR lighting type. Other fluorescent lighting and LED lighting may be of the low CCT non-IR lighting type. The process of calibrating different types of lighting to produce corresponding different versions of color converting matrix A is sometimes referred to as segmented calibration.

Figure 13:
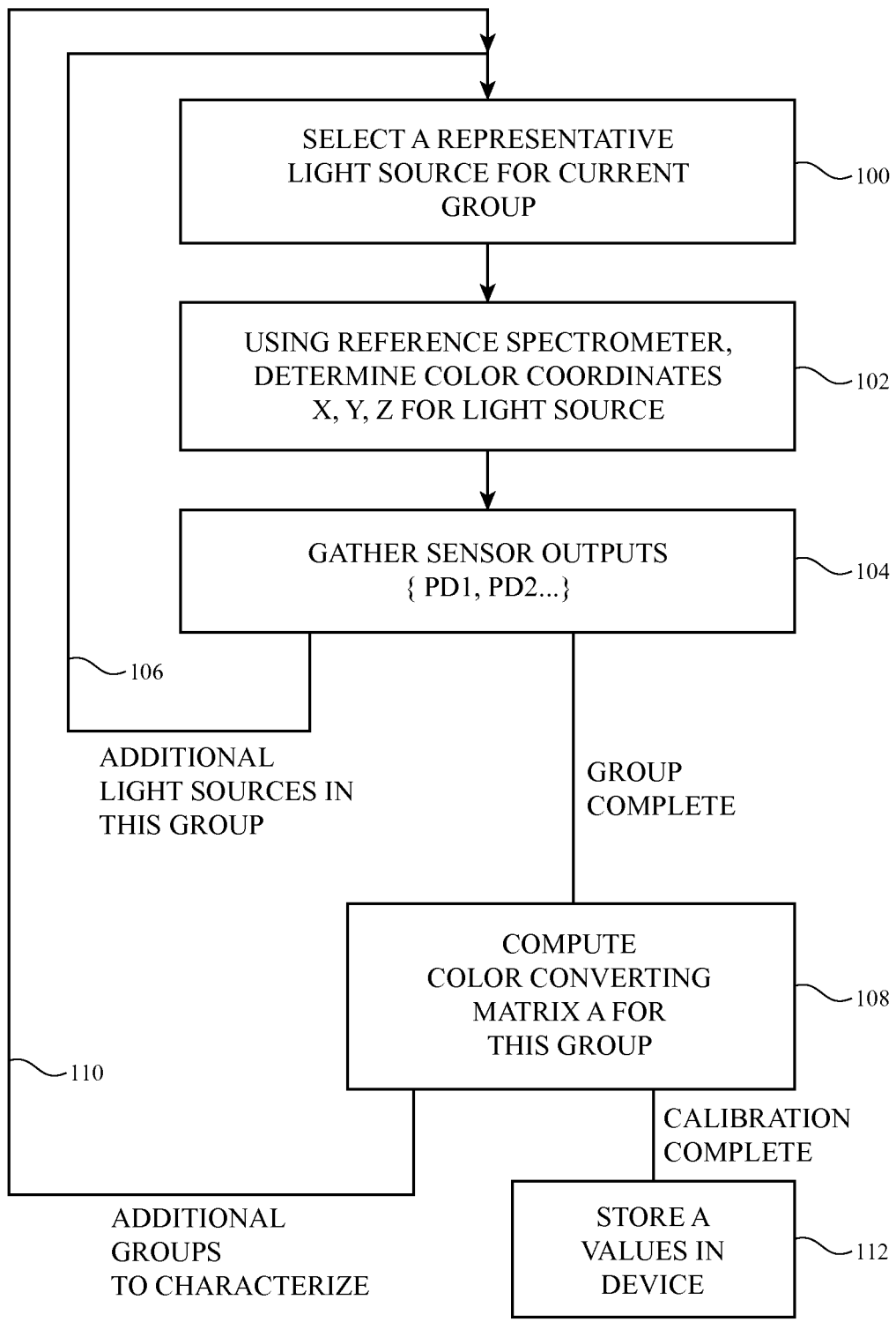
FIG. 13 is a flow chart of illustrative steps in calibrating a color sensing ambient light sensor in accordance with an embodiment.

Illustrative steps involved in calibrating sensor 26 using a segmented calibration approach are shown in FIG. 13.

At step 110, a light source for a group of light sources of a particular type is selected. For example, an incandescent light or halogen light may be selected when it is desired to perform calibration operations to produce a version of color converting matrix A that pertains to IR light sources.

After selecting a light source for which it is desired to make calibration measurements, a reference spectrometer may be used to make a color measurement on the selected light source. For example, the spectrometer may measure color coordinates X, Y, and Z for the light source (step 102). This information may be used to determine the values for a column of matrix P corresponding to the selected light source.

Once the color coordinates for the current selected light source have been gathered and stored, sensor 26 may be exposed to light from the current selected light source (or to a simulated version of this light source produced by a tunable light-emitting diode, a tunable source based on a tunable liquid crystal filter, etc.). In particular, sensor 26 may, at step 104, make a measurement on the current light source and may produce corresponding detector signals (i.e., each of detectors PD1 . . . PD6 may produce an output signal). This information may be stored to produce one of the columns of matrix Q of FIG. 11.

As indicated by line 106, processing may loop back to step 100 in the event that it is desired to acquire data from one or more additional light sources in the same group of light sources (i.e., additional IR light sources in the illustrative scenario in which sensor 26 is being calibrated using a group of IR light sources).

Once sensor data corresponding to a representative selection of light sources in the current group has been collected (i.e., once data from all m IR light sources has been used to populate the columns of matrices P and Q in the present example), matrix A may be computed from matrix Q and P at step 108. In computing color converting matrix A, a matrix inversion technique such as the pseudoinverse technique may be used to invert sensor spectral response matrix Q. Color converting matrix A may then be calculated by multiplying matrix P and pseudoinverse matrix $Q^{-1}$ according to equation 1.

$$A = PQ^{-1} \quad (1)$$

If it is desired to perform additional calibration operations (e.g., to calibrate a group of light sources of the non-IR high CCT type or a group of light source of the non-IR low CCT type), a new lighting type may be selected and processing may loop back to step 100, as indicated by line 110. After data has been gathered for each desired lighting type, the values of the matrix A that were produced for all of the desired lighting types may be stored in device 10 to calibrate sensor 26 and device 10 (step 112).

Figure 14:
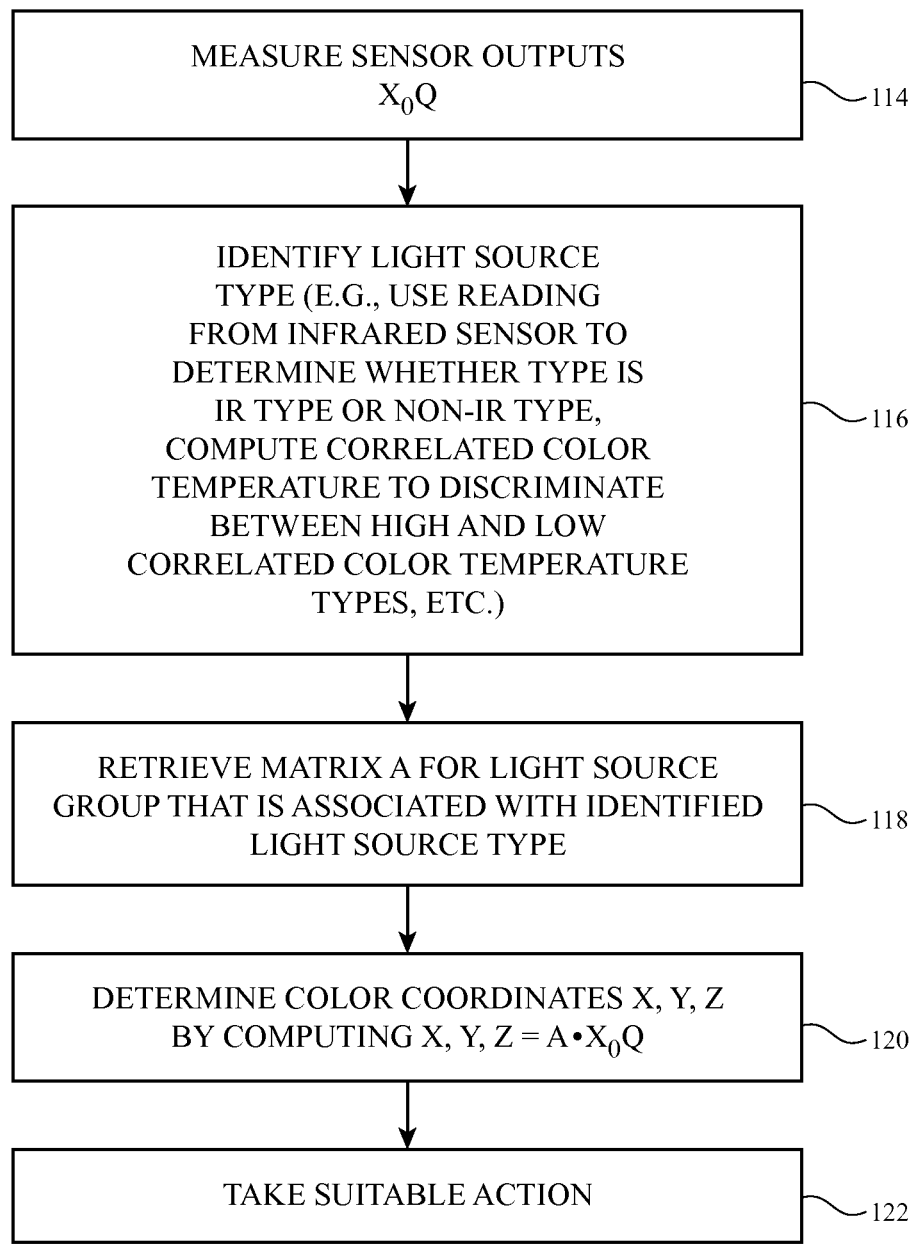
FIG. 14 is a flow chart of illustrative steps involved in making color measurements with a color sensing ambient light sensor during operation of an electronic device in accordance with an embodiment.

A device having a sensor that has been calibrated using this type of segmented calibration scheme may be operated in accordance with the flow chart of FIG. 14. At step 114, device 10 may be exposed to ambient light having a spectrum $x_o$. When exposed to input light $x_o$, sensor 26 will produce an output $x_oQ$ that can be gathered by device 10 and stored (e.g., using control circuitry 16).

After gathering the detector output signals from sensor 16 at step 114, device 10 may, at step 116, identify which type of light source is currently being used to illuminate device 10. For example, if IR detector PD7 detects that more than a predetermined amount of infrared light is present relative to the total ambient light reading, the current lighting conditions can be characterized as falling within the IR lighting type. If there is no IR light present (i.e., if the IR signal is less than a predetermined amount relative to the other types of light), the lighting source can be characterized as being one of the non-IR types. A correlated color temperature measurement may then be used to determine whether the non-IR light source that is illuminating device 10 is a high or low correlated color temperature light source.

After identifying the type of light source that is currently being used to produce ambient light 52 in the vicinity of device 10 and ambient light sensor 26, control circuitry 16 may retrieve an appropriate color converting matrix A for that light source type from storage (step 118). For example, control circuitry 16 may retrieve the IR light source version of matrix A in response to identifying the present lighting conditions as being of the IR type.

At step 120, the color (i.e., the color coordinates) of the measured ambient light can be determined by multiplying the measured sensor output by the retrieved version of A. If desired, ambient light sensor color information from sensor 26 may be gathered or converted to produce color temperature data, correlated color temperature data, or other color information in addition to or instead of color coordinates. The use of sensor 26 to make color measurements that are stored as color coordinates is merely illustrative. Any color ambient light information (and intensity information) may be gathered and used by device 10, if desired.

At step 120, device 10 may use control circuitry 16 to take suitable action based on the measured color of the ambient light (and, if desired, based on light intensity). For example, device 10 may adjust the color of the images being displayed on display 14, may make other adjustments to display 14, etc.

If desired, ambient light sensor 26 may be calibrated by sweeping a tunable light source across a wavelength range of interest for calibration (e.g., the visible spectrum). The tunable light source may be a monochromator, may be a tunable light-emitting diode, may be a wide-band light source with a tunable filter such as a liquid crystal tunable filter, or may be any other tunable light source. As the tunable light source is swept across the wavelength range of interest, the response of sensor 26 may be monitored and sensor response data may be processed and stored in device 10 for use in calibrating sensor 26. If desired, the tunable sensor may simulate the spectrum of one or more light sources of different types.

In the example of FIG. 10, photodiodes were arranged in rows and columns. If desired, the photodiodes may be arranged in circular patterns or other centrally symmetric patterns (i.e., shapes that exhibit a common-centric structure in which pairs of photodiodes are surround a common point and oppose one another across the central point). These common-centric structures can have two-fold symmetry (pairs of photodiodes oppose one another) or may have four-fold symmetry (first, second, third, and fourth photodiodes are arranged around a common point so that the first and second photodiodes oppose one another across the central point and so that the third and fourth photodiodes oppose one another across the central point. The use of common-centric arrangements for the photodiodes helps reduce the impact of the angular orientation of incoming ambient light on the output of sensor 26. In the illustrative configuration of FIG. 15, for example, sensor 26 has photodiodes 60 of six different spectral sensitivities (PD1, PD2, PD3, PD4, PD5, and PD6). These photodiodes may be visible light photodiodes and/or photodiodes with spectral responses that extend into infrared wavelengths. For example, each of the six photodiodes may be associated with a respective one of the visible light spectra in FIG. 11 or other suitable spectra.

The photodiodes may each be split into a pair of first and second photodiode portions on opposing sides of central point 150, providing the photodiodes of sensor 36 with central symmetry. For example, photodiodes PD1 is split into a first photodiode portion PD1-1 and a corresponding second photodiode portion PD1-2 on the opposite side of point 150. This same pattern may be used for each of photodiodes 60, so that each photodiode has a portion on one side of point 150 and on an opposing side of point 150.

Figure 15:
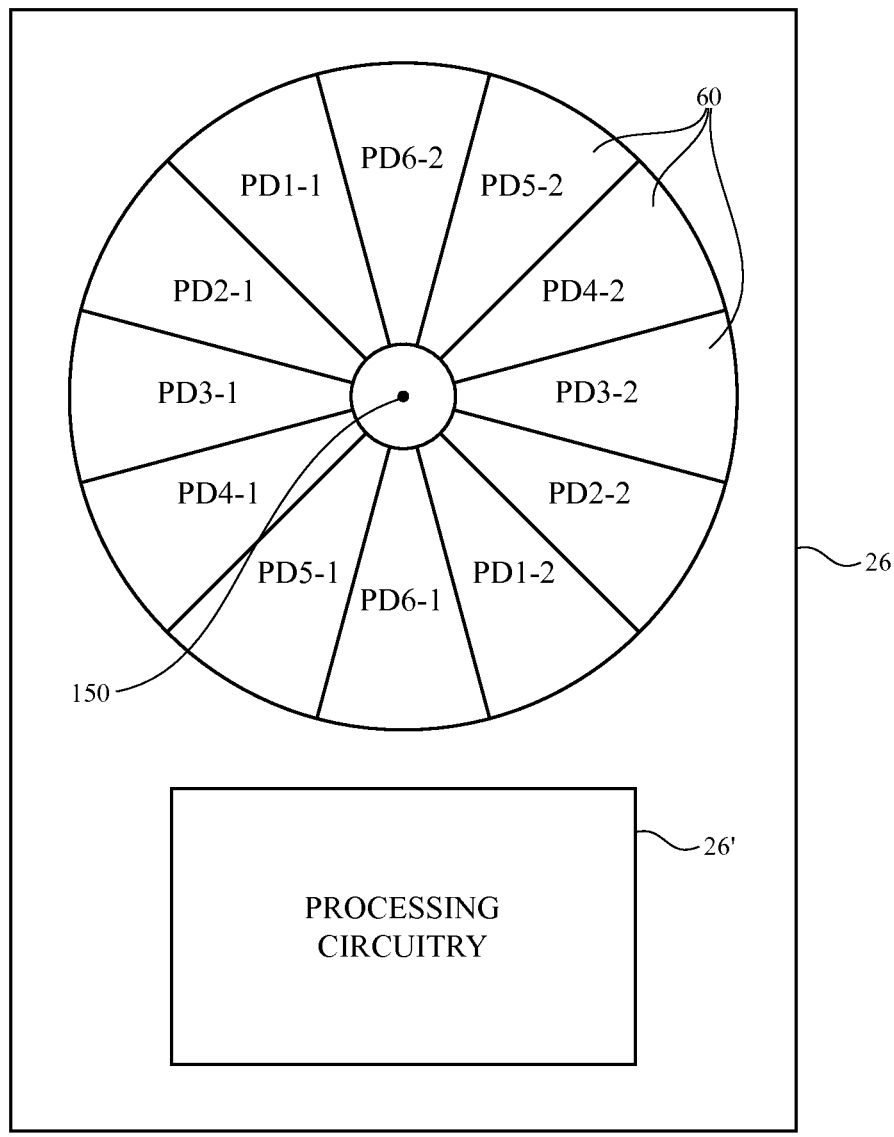
FIGS. 15 and 16 are top views of illustrative multichannel ambient light sensors with photodetectors arranged in a circular shape to enhance angular performance of the ambient light sensors in accordance with an embodiment.

By arranging photodiode areas in this way, the photodiodes exhibit central symmetry and exhibit a reduced angular sensitivity. Due to the scattering profile of the incoming ambient light when passing through the light redirection structure, off-angle ambient light (e.g., light that is not parallel to the surface normal of sensor 26) will tend to increase the output of one half of each photodiode while decreasing the output of the other half of that photodiode. For example, off-axis light might increase the output of first photodiode portion PD1-1 of photodiode PD1, but will tend to decrease the output of second photodiode portion PD1-2 of photodiode PD1 by a corresponding amount, so the total output from each photodiode remains relatively independent of incoming light angle. Non-circular patterns may also be used to reduce angular sensitivity in configurations with split photodiodes (e.g., square common-centric layouts, etc.). The use of a centrally symmetric (common-centric) circularly shaped photodiode layout in the example of FIG. 15 is merely illustrative. The common-centric photodiode layout may exhibit two-fold symmetry or four-fold symmetry (as examples).

Figure 16:
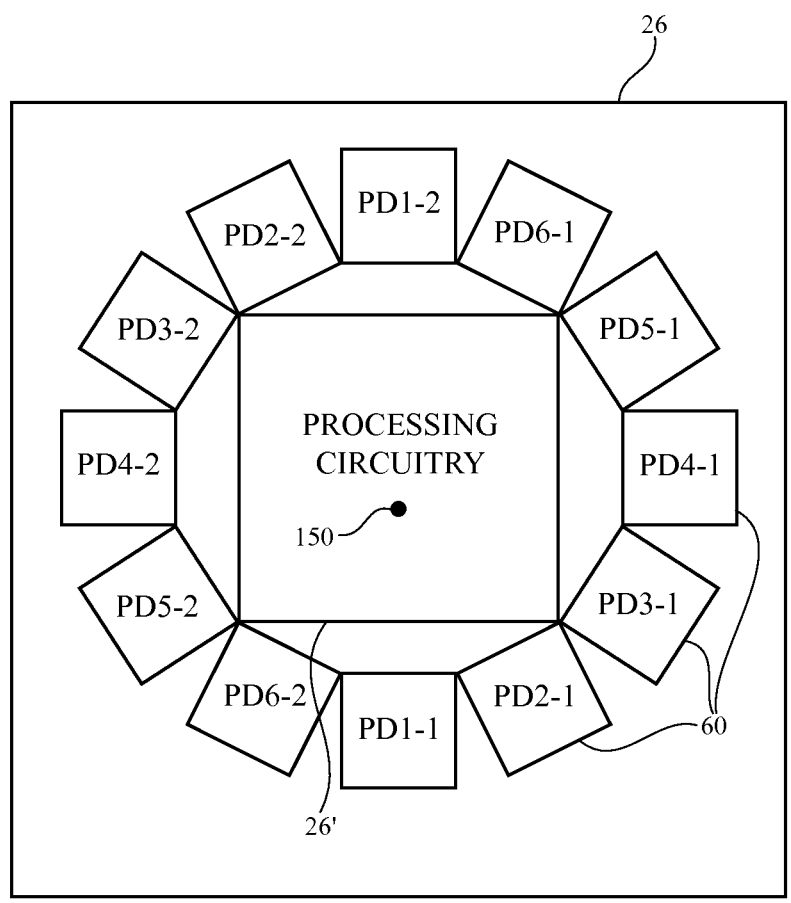

In the FIG. 15 arrangement, light sensor processing circuitry 26' has been implemented on the same die as photodiodes 60 at a location that is offset from photodiodes 60. FIG. 16 is a diagram showing how the circular ring-shaped photodiode region for photodiodes 60 may surround processing circuitry 26' or other control circuitry 16 (e.g., to enhance layout efficiency). Other layouts may be used, if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device that is exposed to ambient light that has an ambient light color, comprising:
    an input-output device that receives input from a user;
    a display that displays images for the user;
    a housing in which the input-output device and the display are mounted;
    control circuitry in the housing; and
    a color sensing ambient light sensor in the housing with which the control circuitry measures an ambient light color, wherein the control circuitry adjusts the display at least partly based on the measured ambient light color, wherein the control circuitry is configured to identify a light source type associated with the ambient light based on sensor data from the color sensing ambient light sensor, to select a color converting matrix based on the identified light source type, and to apply the color converting matrix to the sensor data from the color sensing ambient light sensor to produce a color measurement associated with the sensor data from the color sensing ambient light sensor.

2. The electronic device defined in claim 1 wherein the color sensing ambient light sensor has at least five light detectors each having a respective spectral sensitivity profile.

3. The electronic device defined in claim 1 wherein the color sensing ambient light sensor has a semiconductor substrate and has at least five light detectors in the substrate each having a respective spectral sensitivity profile.

4. The electronic device defined in claim 3 wherein at least one of the spectral sensitivity profiles is a standard observer color matching function and at least one of the spectral sensitivity profiles is a visible light spectral sensitivity profile that is not a standard observer color matching function.

5. The electronic device defined in claim 3 wherein at least one of the spectral sensitivity profiles is within a 20% root-mean-square deviation from a standard observer color matching function disregarding wavelength differences between the at least one of the spectral sensitivity profiles and the standard observer color matching function.

6. The electronic device defined in claim 3 wherein one of the spectral sensitivity profiles matches a standard observer color matching function.

7. The electronic device defined in claim 6 wherein one of the spectral sensitivity profiles matches a $\bar{z}$ CIE standard observer color matching function and wherein one of the spectral sensitivity profiles matches a $\bar{y}$ CIE standard observer color matching function.

8. The electronic device defined in claim 3 wherein one of the spectral sensitivity profiles matches an upper half of an $\bar{x}$ CIE standard observer color matching function.

9. The electronic device defined in claim 8 wherein the color sensing ambient light sensor has fewer than seven visible light detectors.

10. The electronic device defined in claim 8 wherein a linear combination of two or more of the spectral sensitivity profiles matches a standard observer color matching function.

11. The electronic device defined in claim 10 wherein the color sensing ambient light sensor has fewer than seven visible light detectors.

12. The electronic device defined in claim 11 further comprising:
an ambient light sensor window in the display; and
a light redirection structure in the ambient light sensor window, wherein the color sensing ambient light sensor receives the ambient light through the ambient light sensor window and the light redirection structure.

13. The electronic device defined in claim 12 further comprising ink in the ambient light sensor window.

14. The electronic device defined in claim 12 wherein the light redirection structure comprises a structure selected from the group consisting of: a diffuser film, a prism film, a privacy film, and a negative lens film.

15. The electronic device defined in claim 12 wherein the light redirection structure comprises a diffuser having a Lambertian scattering profile.

16. The electronic device defined in claim 12 wherein the light redirection structure comprises a diffuser having a scattering profile that differs at any angle of light incidence on the diffuser by less than 20% from a Lambertian scattering profile at that angle of light incidence.

17. The electronic device defined in claim 1 wherein the electronic device is selected from the group consisting of: a portable computer, a tablet computer, a cellular telephone, and a wrist-watch device.

18. The electronic device defined in claim 1 wherein the color sensing ambient light sensor has light detectors each having a respective spectral sensitivity profile.

19. The electronic device defined in claim 18 wherein the light detectors are arranged in a common-centric layout.

20. The electronic device defined in claim 19 wherein the common-centric layout exhibits four-fold symmetry.

21. The electronic device defined in claim 19 wherein the common-centric layout exhibits two-fold symmetry.

22. The electronic device defined in claim 18 wherein each of the light detectors comprises at least a first portion and a second portion on opposing sides of a central point.

23. The electronic device defined in claim 18 wherein each of the light detectors has a first portion and a second portion to reduce angular sensitivity for the color sensing ambient light sensor.

24. The electronic device defined in claim 1 wherein the control circuitry adjusts the display based directly on the produced color measurement.

25. A method for using a color sensing ambient light sensor, comprising:
calibrating the color sensing ambient light sensor, wherein calibrating the color sensing ambient light sensor comprises:
for each of a plurality of ambient light source lighting types, measuring color coordinates for each of multiple ambient light sources with a reference spectrometer and gathering sensor data from the color sensing ambient light sensor while the color sensing ambient light sensor is exposed to ambient light from each of the multiple ambient light sources of that ambient light source lighting type; and
processing the gathered sensor data and the measured color coordinates to produce a plurality of color converting matrices, each color converting matrix corresponding to a respective one of the plurality of ambient light source lighting types;
gathering additional sensor data with the color sensing ambient light sensor; and
with control circuitry, identifying a light source type associated with received ambient light based on the additional sensor data.

26. The method defined in claim 25 wherein processing the gathered sensor data and the measured color coordinates comprises multiplying a color coordinate matrix that contains the measured color coordinates and a pseudoinverse of a sensor spectral response matrix associated with the color sensing ambient light sensor.

27. A color sensing ambient light sensor for a portable electronic device having a display with a color that is adjusted based on color measurements from the color sensing ambient light sensor, comprising:
a semiconductor substrate;
at least five visible light detectors in the semiconductor substrate, each having a different spectral sensitivity profile, wherein at least one of the five visible light detectors has a spectral sensitivity profile that matches a standard observer color matching function and wherein at least one of the five visible light detectors has a spectral sensitivity profile that does not match a standard observer color matching function; and
control circuitry configured to identify a light source type associated with received ambient light based on sensor data from at least one of the five visible light detectors.

28. The color sensing ambient light sensor defined in claim 27 further comprising an infrared light sensor in the semiconductor substrate.

29. The color sensing ambient light sensor defined in claim 27 wherein the visible light detectors include a red light detector that measures infrared light.

30. The color sensing ambient light sensor defined in claim 27 wherein each of the visible light detectors is formed from first and second portions on opposing sides of a shared central point.

* * * * *